United States Patent [19]
Witt

[11] Patent Number: 4,569,370
[45] Date of Patent: Feb. 11, 1986

[54] BALANCED DOUBLE CAGE CHOKE VALVE

[75] Inventor: Robert L. Witt, Houston, Tex.

[73] Assignee: Best Industries, Inc., Houston, Tex.

[21] Appl. No.: 551,138

[22] Filed: Nov. 14, 1983

[51] Int. Cl.[4] .................. F16K 47/08; F16K 47/14
[52] U.S. Cl. ...................... 137/625.3; 137/625.37; 138/43
[58] Field of Search .............. 137/625.37, 625.38, 137/625.3; 138/43

[56] References Cited

U.S. PATENT DOCUMENTS

| | | |
|---|---|---|
| 1,285,769 | 11/1918 | Melcher . |
| 1,436,417 | 11/1922 | Trumble . |
| 1,807,446 | 5/1931 | Smeby .................. 137/625.37 |
| 3,605,787 | 9/1971 | Krogfoss . |
| 3,660,979 | 5/1972 | Kamakara et al. . |
| 3,776,278 | 12/1973 | Allen . |
| 3,880,399 | 4/1975 | Luthe . |
| 4,041,982 | 8/1977 | Lindner .................. 137/625.37 X |
| 4,103,696 | 8/1978 | Cary . |
| 4,108,210 | 8/1978 | Luthe et al. . |
| 4,149,563 | 4/1979 | Seger . |
| 4,154,263 | 5/1979 | Cary . |
| 4,397,331 | 8/1983 | Medlar . |

FOREIGN PATENT DOCUMENTS

| | | |
|---|---|---|
| 1050626 | 2/1959 | Fed. Rep. of Germany . |
| 2023862 | 12/1971 | Fed. Rep. of Germany . |
| 2423749 | 11/1975 | Fed. Rep. of Germany ... 137/625.3 |

Primary Examiner—Arnold Rosenthal
Attorney, Agent, or Firm—Pravel, Gambrell, Hewitt & Kimball

[57] ABSTRACT

A high pressure fluid control valve comprises a body having an inlet, an outlet and a cavity disposed about a vertical axis. An outer cage having a plurality of radially disposed openings is sealably mounted in the cavity and has a vertical axis substantially aligned with the vertical axis of the cavity. An inner cage having a smaller diameter than the outer cage is sealably mounted in the cavity. The inner cage has radially disposed openings at its upper end, said upper end extending inside the outer cage thereby defining an annulus between the two cages. The inner cage has openings which are in fluid communication with the openings on the outer cage as well as the valve outlet. A plug operates partly within the annulus in a direction parallel to the vertical axis of the cavity and simultaneously restrict the radially disposed openings of the inner cage and the outer cage thereby regulating pressure drop or flow from the inlet to the outlet of the valve.

6 Claims, 3 Drawing Figures fig.1 fig.2

BALANCED DOUBLE CAGE CHOKE VALVE

FIELD OF THE INVENTION

This invention relates generally to fluid flow control valves of the type which are continuously adjustable from a closed position to an open position to provide a quantity of fluid flow or pressure drop which is a function of valve position. More particularly, this invention relates to flow or pressure control valve trims for use in fluid systems in which high pressure drops must be achieved across a valve without concomitant cavitation, noise generation and physical damage to valve parts.

BACKGROUND OF THE INVENTION

In operation of valves for controlling fluid flow or pressure drop, cavitation within the valve has always been a matter of serious concern. Where excessive cavitation occured, throttling valves have been literally destroyed within a few hours of operation. In general, cavitation resulted during throttling of a liquid under pressure when the pressure drop of the liquid in the region of the throttling orifices falls below the vapor presure of the liquid. In the typical situation, where water was the control fluid, this caused the momentary formation of steam bubbles just downstream of the throttling surfaces. As the flowing liquid continued beyond the throttling surfaces, the its pressure rose to exceed the vapor pressure of the liquid, causing a sudden collapse or implosion of the steam bubbles. This resulted in a sonic shock wave, which was transmitted through the liquid to the adjacent surfaces of the valve. Where the energy of the shock waves exceeded the fatigue limits of the valve material, the material was quickly cavitated away, and the valve was destroyed.

In order to minimize cavitation damage it has been proposed heretofore to effect the desired pressure drop in a series of individual steps, so calculated that the pressure drop in any individual step was sufficiently low that cavitation minimized. Other proposals involved dividing the flowing fluid into a large plurality of individual streams, so that the cavitation energy of each stream was reduced to an acceptable level. Although these prior proposals made significant improvements in the operating life of high pressure throttling valves, cavitation remained a serious problem.

Valve noise has been traditionally associated with large pressure drops across a valve. In the past, low noise valves have been constructed so as to sequentially restrict pressure drop or with an additional diffuser downstream of the valve's internal restriction or with a muffler attached to the outlet piping of a valve. According to accepted principles, a given fluid flowing at a given rate through a valve which experiences a pressure drop will produce significantly less noise if the given pressure drop occurs over successive restrictions as distinguished from occurring across a single restriction of a size required to produce the same pressure drop. The restrictions may be in the form of perforations, apertures, or fluid passages acting in parallel. The total restriction present in such a valve for any given plug position is thus the sum of the individual sequential of restrictions or stages.

DESCRIPTION OF THE PRIOR ART

Numerous attempts have been made to solve the problems of cavitation noise generation, and metal erosion in fluid flow control or pressure control valves. One way was to divide the throttling action of a control valve into a number of throttling stages of conventional plug and orifice design, each of the stages providing a fractional amount of the pressure drop required. This approach utilized a number of conventional plug and orifice valves within a single body.

Another attempted solution was to incorporate a lengthy fluid flow path of tortuous or labyrinthine configuration within the internal elements of a valve. Typical of such valves are those taught by U.S. Pat. No. 3,880,399 to Luthe. Such valves were commonly characterized as producing adiabatic flow with friction, or pressure reduction accompanied by constant fluid enthalpy which allegedly rendered these valves less susceptible to cavitation damage and resulted in quieter valve operation. Manufacture of such valves required costly, complex machining operations on the valve elements.

A third approach to these problems was to provide within the valve body a cage member having perforated or slotted walls and a valve plug member slidable therein. In a valve of this type, exemplified by U.S. Pat. No. 3,776,278 to Allen, the flowing fluid was subdivided into many smaller streams or jets flowing through the holes in the valve cage. While these prior art valves did achieve some noise reduction, a further reduction in noise generation was often desirable.

Yet another treatment for noise and corrosion problems was to use a valve cage trim made up of a stack of annular plates or disks having a valve plug member slidable therein. A set of grooves forming tortuous passageways, orifice and baffle arrangements, or the like was etched or machined on these plates. Manufacture of this type of valve trim was necessarily expensive in comparison with other techniques. Moreover, retention of the disks in proper alignment presented a problem, and in operation these valves were more susceptible to plugging by particulate matter entrained in the flowing fluid than the valve types described above.

SUMMARY OF THE INVENTION

Briefly, according to the present invention, a high pressure fluid control valve which includes a body having an inlet, an outlet and a cavity disposed about a longitudinal axis is provided with a unique valve cage assembly. An outer cage having a plurality of radially disposed bores is sealably mounted in the cavity having its longitudinally axis substantially aligned with the longitudinal axis of the cavity. An inner cage having a smaller diameter than the outer cage is sealably mounted in the cavity concentrically with the outer cage. The inner cage has radially disposed bores at its upper end, and the upper end extends inside the outer cage to define an annulus between the two cages. The radial bores in the inner and outer cages communicate with each other and the valve inlet and outlet to form a controllable fluid passageway. A plug operating partly within the annulus in a direction parallel to the longitudinal axis of the cavity simultaneously restricts the radially disposed bores of both inner and outer cages thereby regulating the pressure drop or flow from the inlet to the outlet of the valve.

The valve of the present invention greatly reduces the noise, cavitation, and erosion normally associated with control devices and reduces the pressure recovery downstream of the flow control. The valve of the present invention may be used to control either the rate of fluid flow or the change in pressure (pressure drop) across the device or the inlet pressure or the downstream pressure or a combination of these.

The valve of the present invention also provides two distinct pressure reduction steps via variable openings within the control area. These two reduction steps are regulated with a single element which changes the area through which the fluid passes in each reduction step in response to a single control action. Further pressure reduction is accomplished between passage of the fluid through the first set of variable openings and the second.

Furthermore, the valve of the present invention provides an initial pressure reduction chamber or annulus and a second pressure reduction chamber to reduce pressure recovery in downstream piping while minimizing both the potential for cavitation damage to the internal structure of the valve and the noise associated with such pressure drops.

DESCRIPTION OF THE PREFERRED EMBODIMENT

In the drawings, the letter V designates generally a valve according to the present invention. Valve V includes a body B, an inner cage I, an outer cage O, and a plug P.

Body B has a mounting surface $10a$ (FIG. 3) and an valve inlet passageway defined by annular surface $10b$ extending inwardly toward the valve center line from mounting surface $10a$. Inlet passage A is in fluid communication with cavity C formed in body B about longitudinal axis $10c$, as will be more fully described hereinbelow. Circumferentially spaced about annular surface $10b$ are a plurality of threaded radial bores $10d$ which extend from mounting surface $10a$ into the body B without protruding into cavity C. Threaded bores $10d$ have threads $10e$ to accommodate bolts or studs (not shown) when a mating flange connected to a pipe (not shown) is fitted to mounting surface $10a$. A groove $10f$ is formed in mounting surface $10a$ to abut a similarly formed groove on a companion flange on a pipe or the like (not shown) thereby providing a receptacle for a gasket (not shown) between mounting surface $10a$ and the companion flange.

Bottom surface $10g$ is disposed at the lower end of mounting surface $10a$ and is perpendicular thereto. As will be further explained hereinbelow, cavity C extends through body B to bottom surface $10g$. A plurality of threaded longitudinal bores $10h$ extend into body B through bottom surface $10g$. Bores $10h$ are provided with threads $10i$ in order to receive threaded studs $10j$ which, in cooperation with nuts $10bb$, secure a lower extension 20 to body B. A circular groove $10k$ is formed in bottom surface $10g$ surrounding the opening of cavity C. A gasket $10l$ is disposed in circular groove $10k$ to form a seal between body B and lower extension 20 as will be more fully described hereinbelow.

Body B is further formed having a back surface $10m$ extending longitudinally from bottom surface $10g$ substantially parallel to mounting surface $10a$. Threaded bores $10n$, $10p$ and $10q$ are provided in body B and extend radially inward from surface $10m$. Bores $10n$, $10p$ and $10q$ are normally closed off by threaded plugs $10r$, $10s$ and $10t$ respectively. Annular passages $10u$, $10v$ and $10w$ connect threaded openings $10n$, $10p$ and $10q$, respectively with cavity C. The purposes of annular passages $10u$, $10v$ and $10w$ will be more fully described hereinbelow.

A top surface $10x$ of body B (FIG. 3) is formed adjacent to back surface $10m$ and mounting surface $10a$. Cavity C extends longitudinally within body B from bottom surface $10g$ to top surface $10x$. A plurality of threaded bores $10y$ are provided in body B surrounding cavity C. Bores $10y$ cooperate with studs $10z$ and nuts $10aa$ to secure a cap 50 to body B as will be more fully described hereinbelow.

Cavity C extends longitudinally through body B from top surface $10x$ to bottom surface $10g$ as well as through lower extension 20. Inlet passage A which communicates with cavity C is formed having its central axis perpendicular to the central axis $10c$ of cavity C. Beginning at top surface $10x$, cavity C is defined by annular surface $60a$ which is connected to axial surface $60b$ at its lower end. Annular surface $60c$ is formed between axial surface $60b$ and axial surface $60d$. Annular surface $60e$ is adjacent axial surface $60d$. Surfaces $60a$ through $60e$ form a receptacle for a bonnet 40 as will be more fully described hereinbelow. Axial surface $60f$ is formed to the lower end of annular surface $60e$ between annular surface $60g$ and tapered surface $60h$. Inlet passage A projects into cavity C at annular surface $60g$. Annular surface $60i$ is formed between tapered surface $60h$ and surface $60j$. A seat 30 is mounted adjacent surfaces $60i$ and $60j$. Annular surface $60k$ connects axial surface $60j$ to bottom surface $10g$ of body B. Annular surface $20e$ defines the continuation of cavity C into lower extension 20 as will be more fully described hereinbelow.

Annular passage $10u$, which connects threaded bore $10n$ with annular surface $60k$, is used to detect leakage past seat 30. Annular passage $10v$, which connects threaded bore $10p$ with annular surface $60g$, is used to bleed pressure off of valve V. Annular passage $10w$, which connects threaded opening $10q$ with annular surface $60c$, is used to detect leakage between bonnet 40 and body B.

As previously described, lower extension 20 is secured to bottom surface $10g$ via studs $10j$ and nuts $10bb$. Lower extension 20 has a annular surface $20a$ which extends longitudinally from bottom surface $20c$. The continuation of cavity C is lower extension 20 as defined by annular surface $20a$ is expanded to a larger diameter within lower extension 20 via tapered surface $20d$ which connects annular surface $20e$ with annular surface $20a$. Annular surface $20e$ extends from tapered surface $20d$ to top surface $20b$. The extension of cavity C, defined by annular surface $20e$, has the identical diameter as that defined by annular surface $60k$ of cavity C. Therefore, when lower extension 20 is affixed to body B cavity C extends smoothly through lower extension 20 to bottom surface $20c$.

Lower extension 20 is formed having an upper flange $20f$, central section $20g$, and a lower flange $20h$. Bores 20*i* are circumferentially spaced around the periphery of upper flange 20*f* to accommodate studs 10*j* for use in connecting lower extension 20 to body 10. Similarly, bores 20*j* are used to secure lower flange 20*h* to a flange in a pipe or similar structure (not shown). A circular groove 20*k* is formed in top surface 20*b* to surround the extension of cavity C. Therefore, when bottom surface 10*g* is in contact with top surface 20*b*, circular groove 10*k* and circular groove 20*k* provide a receptacle for gasket 10*L*. Gasket 10*l* provides a seal between annular surfaces 60*k* and 20*e* and lower extension 20. A similar circular groove 20*l* is formed in bottom surface 20*c* surrounding central bore 20*a* and adapted to accept a gasket (not shown) when a pipe flange or like structure having a corresponding circular groove is connected to lower flange 20*h*.

Figure 3:
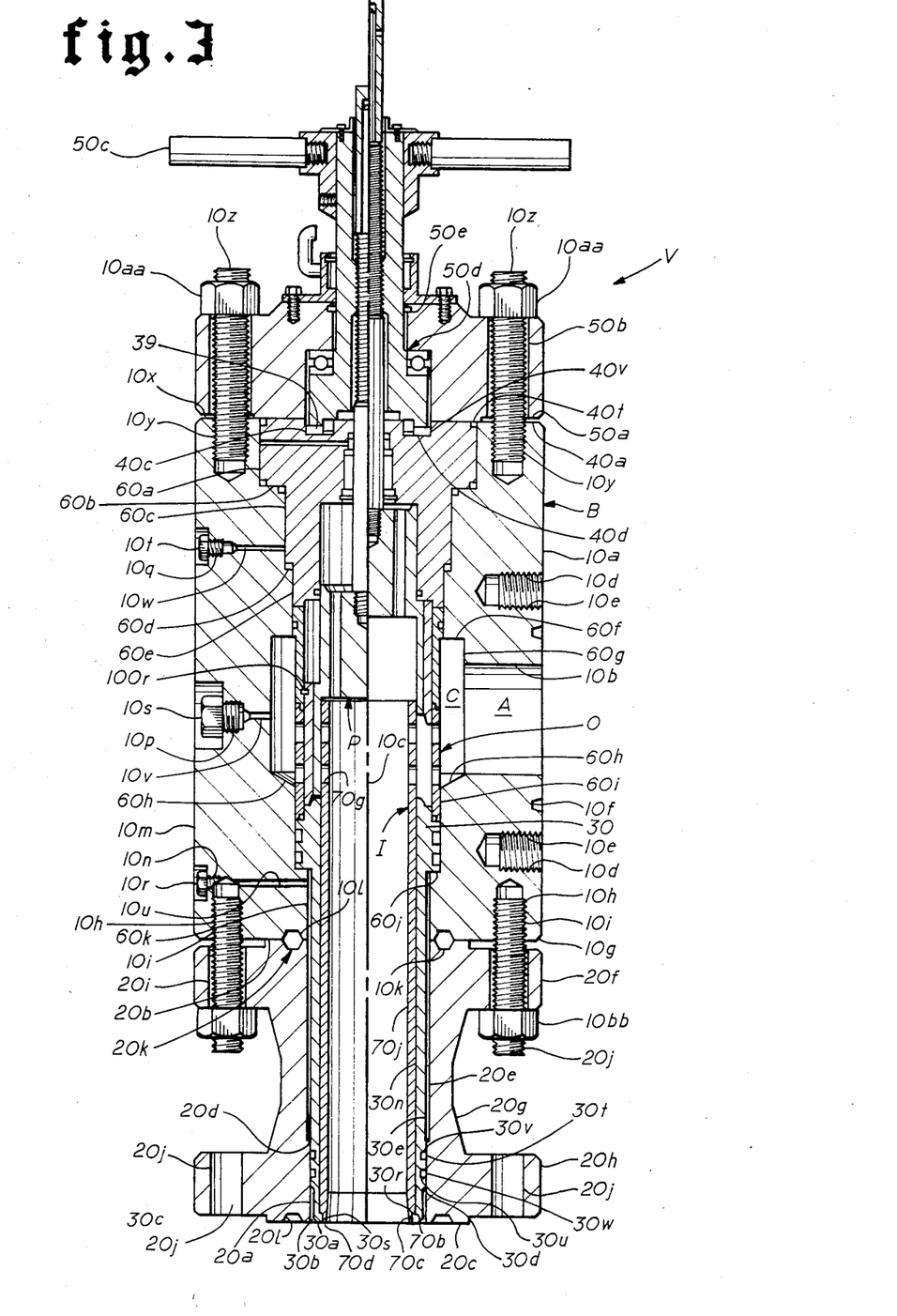
FIG. 3 is a sectional elevation of another embodiment of a valve according to the present invention with one half illustrating the valve in the closed position and the other half illustrating the valve in the fully open position.

Bonnet 40 is retained within body B by bolts 10*z* which extend through cap 50 and are secured in threaded bores 10*y* (FIG. 3). Bonnet 40 has a top surface 40*a* (FIG. 1) which is in substantial alignment with top surface 10*x* of body B. A circumferential groove 39 projects into bonnet 40 from top surface 40*a* and is defined by longitudinal surfaces 40*b* and 40*c* and axial surface 40*d*. Circumferential groove 39 houses a portion of the plug actuation assembly as will be described herein and may be adapted to suit the particular actuation assembly employed.

Figure 1:
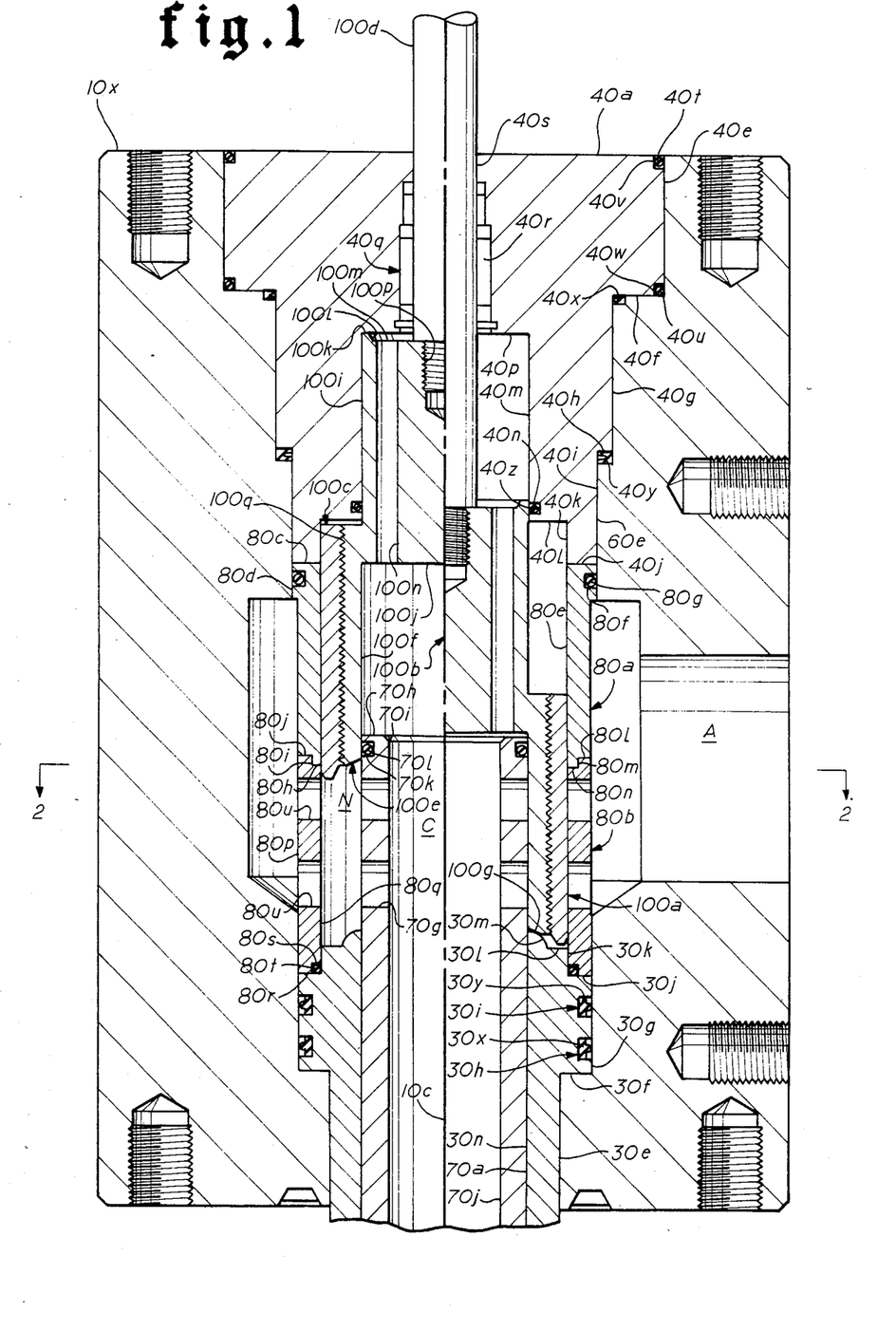
FIG. 1 is a sectional view through the valve of the present invention with one half of FIG. 1 illustrating the valve in a fully open position and the other half illustrating the valve in a fully closed position.

For example, in FIG. 1, an alternative embodiment of bonnet 40 is illustrated without a circumferential groove 39. In this embodiment, bonnet 40 includes an annular surface 40*e* which connects top surface 40*a* to axial surface 40*f*. As best seen in FIG. 1, annular surface 40*g* connects axial surface 40*f* and axial surface 40*h*. Annular surface 40*i* connects axial surface 40*h* with bottom surface 40*j*. Annular surface 40*k* connects axial surface 40*l* to bottom surface 40*j*. Annular surface 40*m* connects axial surface 40*p* with axial surface 40*l*. A circumferential groove 40*n* is formed in annular surface 40*m*. A series of annular surface labeled 40*q* extend from axial surface 40*p* to annular surface 40*s*. A packing 40*r* is installed between the valve stem 100*d* and annular surfaces 40*q* for sealing around the valve stem 100*d* which reciprocates in body B.

Referring again to FIG. 3, leak detector passage 40*aa* may be provided so that leaks past packing 40*r* may be detected. Passage 40*aa* extends from surface 40*q* to surface 40*e* adjacent surface 60*a* of cavity C. Seals 40*t* and 40*u* are disposed in circumferential notches 40*v* and 40*w*, respectively, in order to seal between annular surface 60*a* and annular surface 40*e*. Similarly, seals 40*x* and 40*y* form a seal between annular surfaces 40*g* and 60*c*. Seal 40*z* which is disposed in circular groove 40*n* forms a seal between annular surface 40*m* and the plug P.

Cap 50 has a bottom surface 50*a* (FIG. 3) which is in contact with top surface 10*x* of body B as well as top surface 40*a* of bonnet 40 and thereby retains bonnet 40 to body B due to the interaction of studs 10*z*, bores 50*b*, and threaded openings 10*y*. As shown in FIG. 3, plug P is disposed to travel longitudinally within body B in response to rotation of handwheel 50*c*. Handwheel 50*c* is used to raise or lower the plug P via a mechanism generally labeled 50*d*, a device well known in the art, which transfers rotational motions of handwheel 50*c* into vertical motions of plug P. As stated earlier, bonnet 40 may be formed having a circumferential groove 39 in its top surface 40*a*. When the valve V is actuated via handwheel 50*c*, cicumferential groove 39 formed in the top of bonnet 40 provides an extension of a housing to accommodate mechanism 50*d*. On the other hand, an external actuator, of a type well known in the art, may be used to raise and lower the plug P, in which case the circumferential groove in the top surface 40*a* of bonnet 40 may not be required (see FIG. 1). A seal 40*t* is provided between bottom surface 50*a* of cap 50 and top surface 40*a* of bonnet 40. Similarly, seal 50*e* is provided between the plug P and the mechanism 50*d* (FIG. 3).

Referring to FIG. 3, seat 30 is disposed in body B and extends into lower extension 20. Seat 30 has a bottom surface 30*a* which is aligned with bottom surface 20*c* of lower extension 20. Tapered surface 30*b* connects annular surface 30*c* to bottom surface 30*a*. Tapered surface 30*d* connects annular surface 30*c* with annular surface 30*e*. Since the outer diameter of cavity C as defined by annular surface 30*e* is smaller than the diameter of cavity C as defined by surfaces 60*k* and 20*e*, an annular gap between seat 30 on one hand and body B and lower extension 20 on the other hand is defined. This annular gap extends from tapered surface 20*d* (which is in contact with annular surface 30*e*) to axial surface 30*f* (see FIG. 1). Annular passage 10*u* connects threaded opening 10*n* to the above-described annular gap between seat 30 and body B in lower extension 20 and may thus be used to sense leakage around seat 30. The the leak detection feature and the above described annular gap are optional and are not included in the embodiment of FIG. 1.

Referring to FIG. 1, axial surface 30*f* connects annular surface 30*e* to annular surface 30*g*. Circumferential grooves 30*h* and 30*i* are formed in annular surface 30*g*. Axial surface 30*j* connects annular surface 30*g* to annular surface 30*k*. Axial surface 30L connects annular surface 30*k* to curved surface 30*m*. Annular surface 30*n* connects curved surface 30*m* to annular surface 30*n*. Annular surface 30*n* is connected to curved surface 30*m* and extends from body B to lower section 20 until its intersection with axial surface 30*r* in lower section 20 (FIG. 1). Annular surface 30*s* connects axial surface 30*r* with bottom surface 30*a*.

Circumferential grooves 30*t* and 30*u* (FIG. 1) are formed in annular surface 30*e* to accommodate seals 30*v* and 30*w*, respectively which provide a seal between seat 30 and lower extension 20. Seals 30*x* and 30*y* located in circumferential grooves 30*h* and 30*i*, respectively, seal between seat 30 and body B.

Inner cage I is mounted in cavity C and extends from body B into lower extension 20 (FIG. 3). Inner cage I is mounted concentrically within cavity C having its longitudinal center line substantially in alignment with longitudinal axis 10*c* of body B. Inner cage I is generally cylindrical with an outer annular surface 70*a* and an axial surface 70*b* at the lower end thereof. An annular surface 70*c* connects axial surface 70*b* to bottom surface 70*d*.

Radially disposed bores 70*g* extend through inner cage I from annular surface 70*a* to allow fluid communication with the interior of cage I. It is understood that the radially disposed bores 70*g* may be round or square or any other suitable shape. Radially disposed bores 70*g* may be set in inner cage 70 in rows with each row parallel to the next in a series of planes transversely perpendicular to axis 10*c* of body B. In the preferred embodiment, radially disposed bores 70*g* are the same size as each other, although different sizes may be employed without departing from the spirit of the invention. Each radially disposed bore 70*g* in a given row has a diametrically opposed bore in the same row of radially disposed openings. Therefore, fluid passing through radially disposed openings 70g is forced to impact upon itself thus dissipating fluid energy and reducing valve component wear.

Inner cage I further includes a top surface 70h which connects tapered surface 70i with annular surface 70a. An annular surface 70j connects tapered surface 70i to bottom surface 70d. Inner cage I is pressed into and retained by seat 30 due to the interaction of surface 70a with surface 30n (FIG. 1), surface 70b with surface 30r (FIG. 3) and surface 70c with surface 30s. Circumferential groove 70k houses seal 70L which provides a seal between inner cage I and plug P.

The upper end of inner cage I which includes radial bores 70g extends partially into outer cage O. Outer cage O is generally cylindrical and is mounted within body B with its longitudinal axis substantially aligned with axis 10c of body B. Referring to FIG. 1 it can be seen that outer cage O includes an upper section 80a and a lower section 80b. Upper section 80a has a top surface 80c in contact with bottom surface 40j of bonnet 40. Top surface 80c connects an outer annular surface 80d to an inner annular surface 80e. Outer annular surface 80d contains a circumferential groove 80f which houses seal 80g thereby sealing between outer annular surface 80d and annular surface 60e of cavity C. In operation, plug P slides against inner annular surface 80e as will be more fully described hereinbelow. Surfaces 80h, 80i and 80j form the junction between upper section 80a and lower section 80b. Surfaces 80h, 80i and 80j are disposed at the lower end of upper section 80a between outer annular surface 80d and inner annular suface 80e.

Lower section 80b is joined to upper section 80a of outer cage O by the interaction of surfaces 80L, 80m and 80n on lower section 80b with surfaces 80j, 80i and 80h, respectively. Lower section 80b is generally cylindrical and includes outer annular surface 80p and inner annular surface 80q. Bottom surface 80r connects outer annular surface 80p and inner annular surface 80q. Bottom surface 80r is in contact with axial surface 30j of seat 30 and inner annular surface 80q is in contact with annular surface 30k of seat 30 at its lower end. Circumferential groove 80s is formed at the lower end of inner annular surface 80q and, along with seal 80t disposed therein, forms a seal between outer cage O and seat 30.

Figure 2:
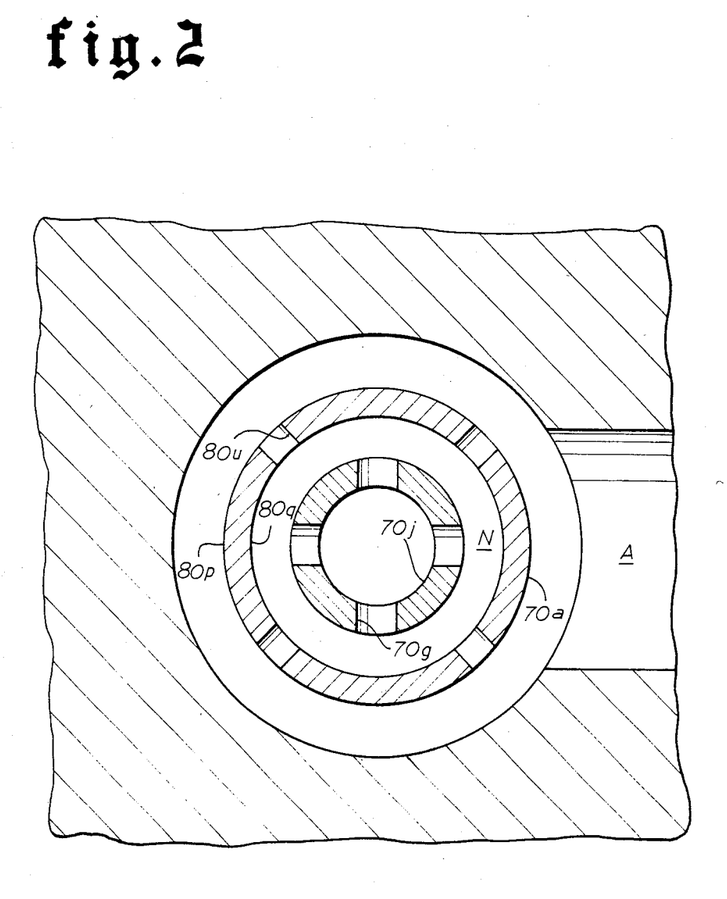
FIG. 2 is a sectional view taken along lines 2—2 of FIG. 1.

Radially disposed bores 80u extend from outer annular surface 80p to inner annular surface 80q. In the preferred embodiment, bores 80u are identically sized but it should be understood that bores 80u may be of any desired size and shape without departing from the spirit of the invention. As shown in FIG. 1, bores 80u are arranged in rows on lower section 80b of outer cage 80. It is preferred that the center line of each row of radially bores 80u be in substantial alignment with the center line of a row of radial bores 70g in inner cage I. The radial distance between surface 70a and surface 80q which defines the width of annulus N should approximate the diameter of the smallest transverse dimension of radial bores 80u in outer cage 80. As shown in FIG. 2, valve cages I and O are positioned in cavity C so that bores 70g and corresponding radial bores 80u are radially misaligned. In this manner, fluid passing from inlet passage A through radial bores 80u in outer cage O is directed at annular surface 70a on inner cage I. The result is that fluid must flow circumferentially and obliquely within annulus N before passing through radial bores 70g. Annulus N is defined by surfaces 80e, 80q (which is aligned with 80e), 30L, 30m, 70a, 100i, 40L and 40k. Annulus N is thus a subchamber of cavity C. This results in an additional pressure drop between the passage through radial bores 80u and 70g. The intermixing of fluid within annulus N after passing through radial bores 80u absorbs fluid energy and reduces noise.

Plug P (FIG. 1) for controlling the fluid flow through valve V includes annular throttling section 100a, central section 100b, step 100c, stem 100d, and seating surface 100e. Generally cylindrical annular throttling section 100a operates longitudinally within annulus N. Section 100a includes annular surface 100f adapted for slidable contact with annular surface 70a on inner cage I and annular surface 100g which contact inner annular surfaces 80e and 80q of upper section 80a and lower section 80b of outer cage 80, respectively. Lower end 100e of annular throttling section 100a includes a seating surface 100h adapted to contact curved surface 30m thereby effectuating closure of the valve V. At the top of annular throttling section 100a is axial step surface 100c connecting annular surface 100g to central section 100b. The area of step 100c measured in a plane perpendicular to central axos 10c is equal to the area of lower end 100e.

Central section 100b is connected to the upper end of annular throttling section 100a and has an annular surface 100i which is adapted to slidably engage annular surface 40m of bonnet 40 as plug P reciprocates. Seal 40n seals between central section 100b and bonnet 40. Central section 100b has a bottom surface 100j which is connected to annular surface 100f of annular throttling section 100a and is disposed parallel to and longitudinally below step 100c. Axial surface 100k is formed at the top of central section 100b and acts as an upper travel stop when it contacts axial surface 40p of bonnet 40. Tapered surface 100L adjoins axial surface 100k and connects axial surface 100k to axial surface 100m thereby defining a gap between axial surface 100m and bonnet 40 when axial surface 100k is in contact with axial surface 40p of bonnet 40. At least one bore 100n having a center line parallel to longitudinal axis 10c extends from bottom surface 100j to axial surface 100m. The purpose of bore 100n is to equalize pressure above and below central section 100b in an effort to reduce the unbalanced forces acting on plug P as will be more fully explained hereinbelow.

Threaded bore 100p is disposed in axial surface 100m to accommodate stem 100d. It is understood that although a threaded connection is shown between stem 100d and central section 100b that an integral stem and central section would not depart from the spirit of the invention.

As stated earlier, the area of step 100c in a plane perpendicular to longitudinal axis 10c of body B is equal to the area of seating surface 100e. The chamber defined by surfaces 100i, 40l, 40k, 80e, and 100c experiences the same pressure as in annulus N due, in part, to the sealing action of seals 40n, 80g, 70L, and 80t and a clearance between surfaces 100g and 80q, 80e. Therefore, longitudinally opposed forces on annular throttling section 100a are in effect balanced due to the similarity of areas of step 100c and seating surface 100e which are exposed to the same pressure but in opposite directions.

Seal 70L causes the fluid pressure downstream of radial bore 70g to exert an upward force against bottom surface 100j. The same fluid force that exerts the upward force against bottom surface 100j is conducted through bore 100n to axial surface 100m. Fluid pressure may then act downwardly on axial surface 100k, tapered surface 100l, and axial surface 100m to counteract the upward forces exerted by fluid pressure on bottom surface 100j. Due to the presence of stem 100d in the top of central section 100b there exists an unbalanced upward force on the plug P equal to the area of stem 100d measured in a plane perpendicular to the vertical axis 10c of the body B times the fluid pressure acting on bottom surface 100j. As shown in FIG. 3, handwheel 50c and mechanism 50d counteract this unbalanced force and apply additional force to cause plug P to reciprocate within the body B.

In operation, fluid enters inlet passage A of body B of the valve V. Inlet passage A is connected to a central cavity C wherein outer cage O is sealably mounted. The inlet fluid stream passes through a pluality of radial bores 80u arranged in rows thereby effectuating a first stage pressure reduction. Having passed through radial bores 80u the fluid stream impacts annular surface 70f thereby directing the fluid flow circumferentially and obliquely within annulus N formed between inner cage I and outer cage O. The intermixing occuring in the annulus N due to the circumferential and oblique flow induced therein causes a further reduction of fluid energy. The fluid then passes through radial bores 70g which are in radial misalignment with bores 80u. Each bore 70g is arranged on inner cage I to have a corresponding, drametically opposed bore 70g thereby causing fluid passing through the radial bores 70g to impinge upon itself which further dissipates fluid energy and reduces wear on internal valve parts. Annular throttling section 100a reciprocates vertically in annulus N to simultaneously restrict the opening size of radial bores 80u and 70g to control the fluid flow through the valve V or the pressure drop or upstream or downstream pressures adjacent valve V. Having passed through radial bores 70g the fluid exits the valve outlet past bottom surface 20c.

As can readily be seen having the annular throttling section 100a of plug 100 disposed in an annulus between outer cage O and inner cage I permits body B of valve V to be considerably smaller than valves known in the art due to the compact design of valve elements. Furthermore, the intermixing of fluid having passed through radial bores 80u combined with the circumferential and oblique flow within annulus N causes fluid energy reduction without requiring an appreciable increase in the valve body size.

It is understood that the components in the valve V are made from a high strength steel or a suitable material to withstand and contain the pressures expected to be encountered in a high pressure pipeline or similar application wherein valve V is connected. Components of valve V which are subject to more severe wear such as annular surface 100g of annular throttling section 100a may be fabricated as part of a removable component 100q which may be hardened with a material such as tungsten carbide.

The foregoing disclosure and description of the invention are illustrative and explanatory thereof, and various changes in the size, shape and materials, as well as in the details of the illustrated construction may be made without departing from the spirit of the invention.

I claim:

1. A high pressure fluid control valve including a body formed having a valve inlet, a valve outlet and an internal longitudinal cavity, said cavity providing fluid communication between the valve inlet and outlet and being adapted to sealably house a valve trim assembly; wherein said trim assembly comprises:

a tubular outer valve cage within the valve body mounted concentrically with the longitudinal axis of the cavity, said outer cage being formed having a first plurality of radial bores for providing fluid communication from the valve inlet to the interior of said outer cage;

said first radial bores are circumferentially spaced about the longitudinal axis of said outer cage and are formed having centers aligned in a plane transversely perpendicular to the longitudinal axis of said outer cage;

a tubular inner valve cage mounted within the valve body concentrically with the longitudinal axis of the cavity, said inner cage having an upper end and a lower end, said upper end having a second plurality of radial bores formed therein for fluid communication to the valve outlet via the interior of said inner cage, said inner cage being mounted to extend partially into said outer valve cage to define an annulus therebetween;

said second radial bores are circumferentially spaced about the longitudinal axis of said outer cage and are formed having centers aligned in a plane transversely perpendicular to the longitudinal axis of said inner cage;

said first radial bores are radially misaligned with said second radial bores so that a fluid flow path is formed from the inlet to the outlet via said outer cage and said inner cage wherein fluid passes from the inlet through said first radial bores and is directed against said inner cage and thereafter forced to flow in said annulus formed around the periphery of said inner cage before passing through said second radial bores thereby reducing noise and dissipating fluid energy in a multi-stage pressure reduction within the valve;

plug means disposed within said annulus and actuable for longitudinal travel therein to control fluid flow from the valve inlet to the valve outlet via said first radial bores, said annulus, and said second radial bores, by simultaneously restricting fluid flow through said first radial bores and said second radial bores;

said plug means comprises:

a cylindrical plug, said cylindrical plug further comprising:

a partly tubular throttling section disposed for longitudinal reciprocal motion within said annulus and partly within said cavity, said throttling section being adapted to simultaneously restrict said first radial bores and said second radial bores in response to valve actuation;

a cylindrical central section connected adjacent the top of said annular throttling section and extending longitudinally therefrom, said central section having a smaller outside diameter than said annular throttling section, said central section formed having a longitudinal bore extending the length thereof for conducting fluid pressure from within said inner cage to the top of said central section;

a stem connected to said top of said central section and sealably mounted for reciprocal motion relative to said body, whereby an unbalanced longitudinal force equal to the area of said stem in a plane perpendicular to the longitudinal axis of said cavity multiplied by the pressure within said inner cage acts on said central section;

said annular throttling section is formed having an upper planar surface extending perpendicularly to the longitudinal axis of said body from the juncture of said throttling section and said central section to form a pressure balancing step;

said annular throttling section is formed having a lower end, said lower end adapted to be exposed to the fluid pressure in said annulus, said lower end being formed having the same effective surface area in a plane perpendicular to the longitudinal axis of the body as said step;

means for applying fluid pressure at the same level as that within said annulus to said step whereby a balance of fluid pressure acting on said annular throttling section in opposed longitudinal directions is maintained; and actuation means with said stem for overcoming said unbalanced force and for actuation of slidable movement of said cylindrical plug;

2. The valve of claim 1, wherein:

said body is formed having a seat disposed at the lower end of said annulus, said seat adapted for engagement with said lower end of said annular throttling section thereby restricting fluid flow through the valve.

3. A high pressure fluid control valve including a body formed having a valve inlet, a valve outlet and an internal longitudinal cavity, said cavity providing fluid communication between the valve inlet and outlet and being adapted to sealably house a valve trim assembly; wherein said trim assembly comprises:

a tubular outer valve cage within the valve body mounted concentrically with the longitudinal axis of the cavity, the valve inlet in initial fluid communication exclusively with said tubular valve outer cage, said outer cage being formed having a first plurality of radial bores for providing fluid communication from the valve inlet to the interior of said outer cage;

a tubular inner valve cage mounted within the valve body concentrically with the longitudinal axis of the cavity, said inner cage having an upper end and a lower end, said upper end having a second plurality of radial bores formed therein for fluid communication to the valve outlet via the interior of said inner cage, said inner cage being mounted to extend partially into said outer valve cage to define an annulus therebetween;

plug means disposed within said annulus and actuable for longitudinal travel therein to control fluid flow from the valve inlet to the valve outlet via said first radial bores, said annulus, and said second radial bores, by simultaneously restricting fluid flow through said first radial bores and said second radial bores;

said plug means comprises:

a cylindrical plug, said cylindrical plug further comprising:

a partly tubular throttling section disposed for longitudinal reciprocal motion within said annulus and partly within said cavity, said throttling section being adapted to simultaneously restrict said first radial bores and said second radial bores in response to valve actuation, said throttling section having a lower end adapted to selectively contact the valve body at the lower end of said annulus, thereby further sealing off fluid flow through said first and second radial bores;

a cylindrical central section connected adjacent the top of said annular throttling section and extending longitudinally therefrom, said central section having a smaller outside diameter than said annular throttling section, said central section formed having a longitudinal bore extending the length thereof for conducting fluid pressure from within said inner cage to the top of said central section;

a stem connected to said top of said central section and sealably mounted for reciprocal motion relative to said body, whereby an unbalanced longitudinal force equal to the area of said stem in a plane perpendicular to the longitudinal axis of said cavity multiplied by the pressure within said inner cage is the net force which acts on said cylindrical plug; and actuation means with said stem for overcoming said unbalanced force and for actuation of slidable movement of said cylindrical plug.

4. A high pressure fluid control valve including a body formed having a valve inlet, a valve outlet and an internal longitudinal cavity, said cavity providing fluid communication between the valve inlet and outlet and being adapted to sealably house a valve trim assembly; wherein said trim assembly comprises:

a tubular outer valve cage within the valve body mounted concentrically with the longitudinal axis of the cavity, the valve inlet in initial fluid communication with said tubular valve outer cage, said outer cage being formed having a first plurality of radial bores for providing fluid communication from the valve inlet to the interior of said outer cage, said first radial bores formed having a smallest transverse dimension;

a tubular inner valve cage mounted within the valve body concentrically with the longitudinal axis of the cavity, said inner cage having an upper end and a lower end, said upper end having a second plurality of radial bores formed therein for fluid communication to the valve outlet via the interior of said inner cage, said upper end of said inner cage being mounted to extend partially into said outer valve cage to define an annulus therebetween, said lower end of said inner valve cage extending to adjacent the valve outlet for mounting said inner valve cage to said valve body;

wherein the radial dimension of the annulus defined between the outer surface of said inner cage and the inner surface of said outer cage is substantially equal to the smallest transverse dimension of said first radial bores; and plug means disposed within said annulus and actuable for longitudinal travel therein to control fluid flow from the valve inlet to the valve outlet via said first radial bores, said annulus, and said second radial bores, by simultaneously restricting fluid flow through said first radial bores and said second radial bores;

said plug means having a lower end adapted to selectively contact the valve body at the lower end of said annulus, thereby further sealing off fluid flow through said first and second radial bores;

said plug means comprises:

a cylindrical plug, said cylindrical plug further comprising:

a partly tubular throttling section disposed for longitudinal reciprocal motion within said annulus and partly within said cavity, said throttling section being adapted to simultaneously restrict said first radial bores and said second radial bores in response to valve actuation;

a cylindrical central section connected adjacent the top of said annular throttling section and extending longitudinally therefrom, said central section having a smaller outside diameter than said annular throttling section, said central section formed having a longitudinal bore extending the length thereof for conducting fluid pressure from within said inner cage to the top of said central section;

means comprising a stem connected to said top of said central section and sealably mounted for reciprocal motion relative to said body for providing an unbalanced longitudinal force equal to the area of said stem in a plane perpendicular to the longitudinal axis of said cavity multiplied by the pressure within said inner cage as the net force acting on said cylindrical plug; and actuation means with said stem for overcoming said unbalanced force and for actuation of slidable movement of said cyindrical plug.

5. The valve of claim 4, wherein:

said annular throttling section is formed having an upper planar surface extending perpendicularly to the longitudinal axis of said body from the juncture of said throttling section and said central section to form a pressure balancing step;

said annular throttling section is formed having a lower end, said lower end adapted to be exposed to the fluid pressure in said annulus, said lower end being formed having the same effective surface area in a plane perpendicular to the longitudinal axis of the body as said step;

means for applying fluid pressure at the same level as that within said annulus to said step whereby a balance of fluid pressure acting on said annular throttling section in opposed longitudinal directions is maintained.

6. The valve of claim 5, wherein:

said body is formed having a seat disposed at the lower end of said annulus, said seat adapted for engagement with said lower end of said annular throttling section thereby restricting fluid flow through the valve.

* * * * *